Figure 1:
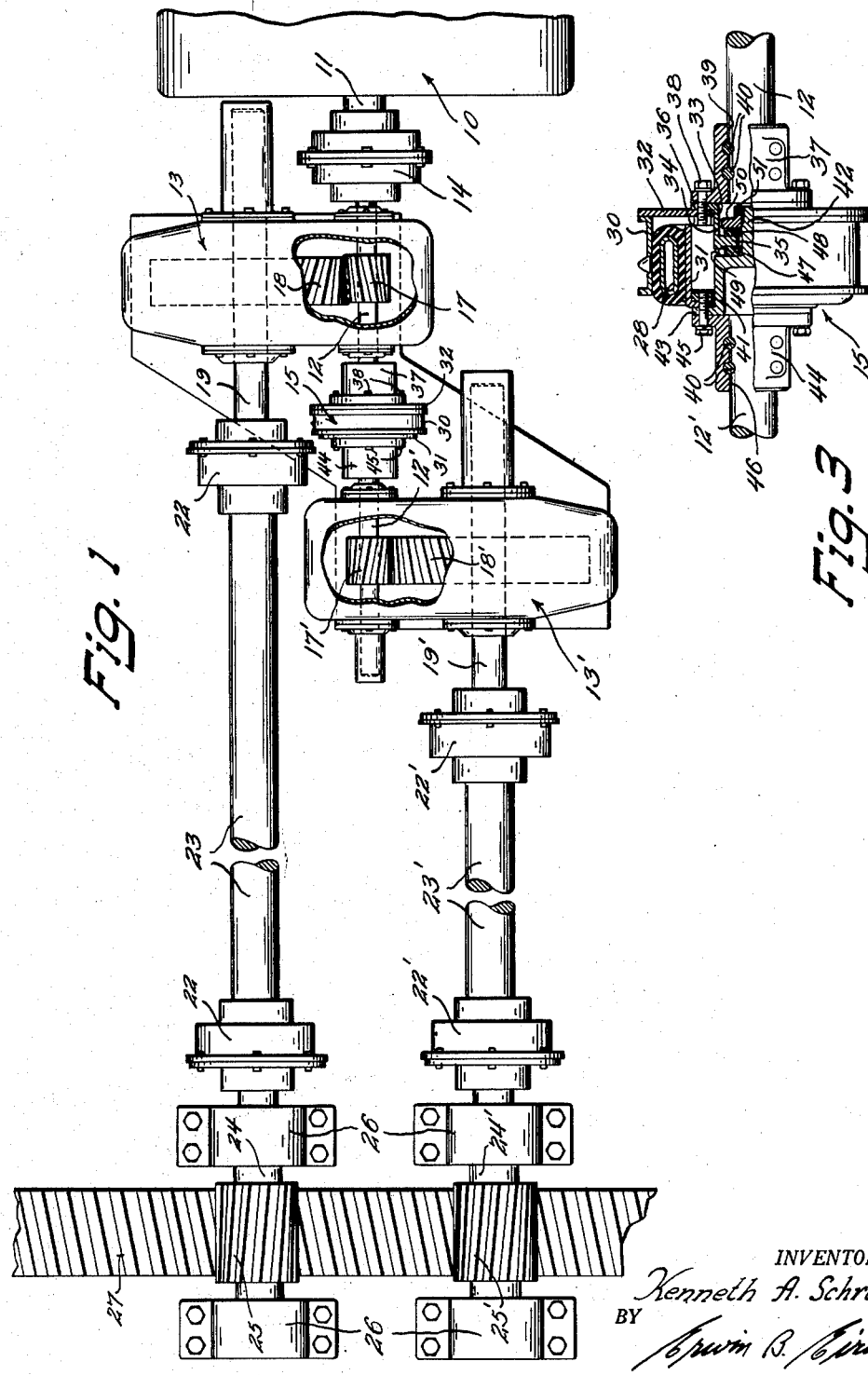

Aug. 24, 1954     K. A. SCHROEDER     2,687,045
POWER TRANSMISSION
Filed Feb. 18, 1952     2 Sheets-Sheet 1

Aug. 24, 1954  K. A. SCHROEDER  2,687,045
POWER TRANSMISSION
Filed Feb. 18, 1952  2 Sheets-Sheet 2

INVENTOR.
Kenneth A. Schroeder
BY
Attorney

Patented Aug. 24, 1954

2,687,045

UNITED STATES PATENT OFFICE 2,687,045

POWER TRANSMISSION

Kenneth A. Schroeder, Milwaukee, Wis., assignor to The Falk Corporation, Milwaukee, Wis.

Application February 18, 1952, Serial No. 272,230

8 Claims. (Cl. 74—410)

This invention relates to a power transmission for effecting a division of power transmitted, through a plurality of gear sets, from a driving mechanism to a driven mechanism.

In many instances, power transmissions embodying the teachings of the present invention are utilized in connection with the transmission of heavy loads to effect the rotation of a massive driven mechanism at a speed considerably lower and a torque considerably higher than that of the driving mechanism. While it has been common practice to interpose a gear set in the form of a speed reducing unit, between the driving and driven mechanisms of the transmission, numerous difficulties have been encountered in so doing, the massiveness of a single speed reducing unit required to transmit the requisite power presents both cost problems and those of physical limitations which frequently preclude the satisfactory application of this type of transmission.

By embodying a plurality of separate parallelly arranged speed reducers between the driving and driven mechanisms of the power transmission, it is possible to effect the desired division of transmitted power in a manner whereby the individual speed reducers, or gear sets, are reduced to a size where they are feasible, effective and economical.

The primary object of the present invention resides in the provision of a new and improved power transmission adapted to provide effective means for dividing the transmitted power through a plurality of individual speed reducing gear sets having physical characteristics which make them relatively inexpensive to produce and readily adapted for effective incorporation into a heavy duty power transmission unit to divide the transmitted power.

A further object of the present invention resides in the provision in a power transmission of a plurality of coupled speed reducers having their power output shafts arranged in parallel to effect a predetermined division of the transmitted load from the driving mechanism to the driven mechanism.

Another object of the present invention resides in the provision of a new and improved power transmission including a plurality of speed reducers constructed in a manner to effect the desired divided transmission of power and simultaneously effect material savings in cost through the utilization of the principle of dividing the transmitted power in a manner which permits the use of considerably smaller and less expensive gear sets or speed reducing units.

Another object of the present invention resides in the provision of a new and improved power transmission including a plurality of parallelly arranged gear sets or speed reducing units including helical driving pinions of opposite hand coupled in a manner adapted to permit their unitary axial movement to effect the transmission of a balanced load through the respective speed reducing gear sets.

A more specific object of the present invention resides in the provision in a power transmission of a plurality of speed reducing units adapted for parallel arrangement to divide the transmitted load and including common coupling means for the power input shafts of the individual speed reducers and separate power output shafts for the individual speed reducers adapted for separate connection with the driven mechanism of the power transmission whereby a division of the transmitted power is delivered to a driven member through the medium of the separate power output shafts of the speed reducing unit.

Other objects and advantages will become apparent from the following description of an illustrative embodiment of the present invention.

Figure 2:
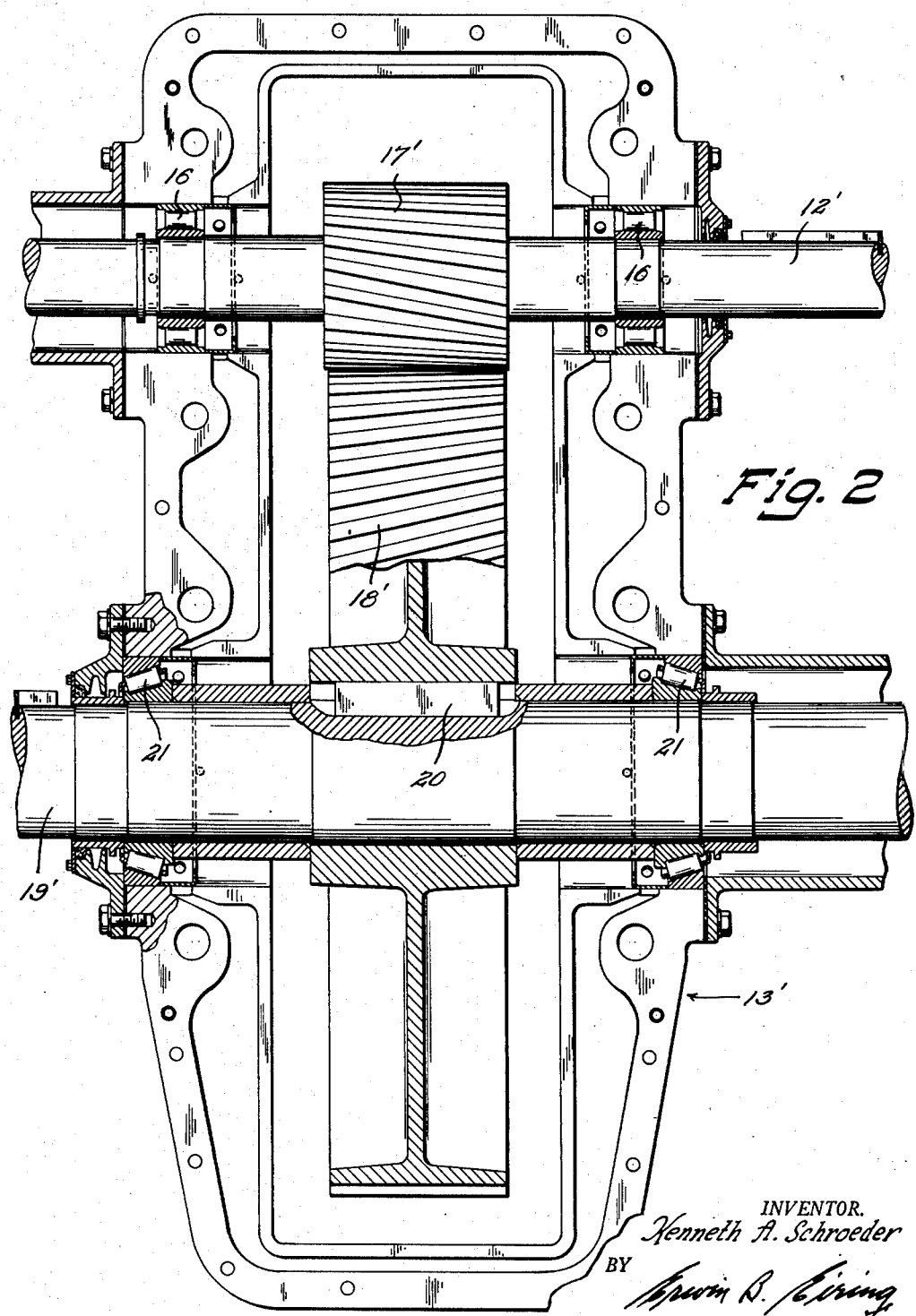

In the drawing:

Figure 1 is a diagrammatic plan view of a power transmission embodying the teachings of the present invention;

Fig. 2 is an enlarged view of one of the speed reducing units, with the cover removed, showing portions of the structure broken away and in section to more clearly illustrate its construction; and Fig. 3 is a view, partially in section, showing the structure of a special coupling adapted to compensate for axial and angular misalignment between the adjacent ends of the respective power input shafts of a pair of speed reducers; the coupling including means for preventing relative axial movement between the power input shafts, of the respective speed reducing units.

The embodiment of the present invention, chosen for illustrative purposes in the accompanying drawings, discloses a power transmission constructed in accordance with the teachings of the present invention and utilized in conjunction with the driving of the ring gear of a relatively large ball mill from a single source of power in the form of a large electric motor. In the present embodiment of the invention the speed reduction between the power output shaft of the driving motor and the ring gear of the driven mechanism represents a reduction of approximately 40 to 1. The massive nature of the driven mechanism makes it advisable to effect the desired reduction in speed and the transmission of the driving power through a plurality of speed reducing units which function to divide the transmitted load through the medium of their separate power output shafts to thereby render the structure capable of production at a relatively low cost.

Referring more particularly to Fig. 1 of the accompanying drawings, it will be noted that the driving member comprises an electric motor 10 having a power output shaft 11 connected to a power input shaft 12 of one of a pair of speed reducers 13 and 13' which are identical in structure, save for the fact that they are disposed in opposite relationship with respect to the power output shaft 11 of the motor 10. The connection between the power output shaft 11 of the motor 10 and the power input shaft 12 of the speed reducer 13 comprises a flexible coupling 14 constructed in a manner to compensate for axial misalignment between the adjacent ends of the coupled shafts. The adjacent ends of the respective input shafts 12 and 12' of the speed reducers 13 and 13' are coupled by means of a flexible coupling 15, to be hereinafter more specifically described, which coupling serves to compensate for axial misalignment between the adjacent ends of the coupled shafts 12 and 12' and simultaneously retains the two shafts 12 and 12' against relative axial movement. Each of the power input shafts 12 and 12' of the speed reducers 13 and 13' are mounted in anti-friction bearings 16 disposed at opposite sides of helical pinions 17 and 17' which form power input gears of the respective speed reducers 13 and 13'. It should be noted, at this time, that the several bearings 16 permit axial movement of the shafts 12 and 12' as a coupled unit in order to balance the reaction forces between the pinions 17 and 17' and their respective cooperating driven helical gears 18 and 18' mounted on power output shafts 19 and 19' in any appropriate manner, such as by the application of keys 20. Each of the power output shafts 19 and 19' of the speed reducers 13 and 13' are journaled adjacent the opposite sides of the gears 18 and 18' in a pair of oppositely disposed anti-friction thrust bearings 21 mounted in any appropriate manner in the housing of the speed reducers 13 and 13'. The ends of the power output shafts 19 and 19' disposed remote from the motor 10 are respectively connected by means of flexible couplings 22 and 22' with one end of separate power transmitting shafts 23 and 23'; while the other ends of the power transmitting shafts 23 and 23' are similarly connected by means of flexible couplings 22 and 22' with pinion shafts 24 and 24' which carry helical toothed driving pinions 25 and 25' respectively and which are mounted in suitable anti-friction bearings 26 disposed at opposite sides of the pinions 25 and 25'. The driving pinions 25 and 25' are disposed in parallel spaced relationship and mesh with a helical toothed driven gear 27 carried by the driven mechanism of the transmission.

Referring more particularly to Fig. 3 of the accompanying drawing, it will be noted that the flexible coupling 15 is of the pneumatic type including a pneumatic cushion 28 interposed between the adjacent inner and outer surfaces of a pair of radially spaced drum members 30 and 31 which form cooperating elements of the coupling 15. The element of the coupling which carries the outer drum 30 also includes a disc 32 having a central aperture 33 adapted to receive and position a cylindrical member 34 including an inwardly directed flange 35 adjacent its inner end and an outwardly directed flange 36 adjacent its outer end. The disc 33 and member 34 are secured to the flange of a member 37 by means of cap screws 38. The member 37 includes an axially disposed bore 39 adapted to receive the end of the power input shaft 12 and arranged for fixed anchoring thereon in any suitable manner such as the application of a plurality of pins 40 to prevent relative rotation or axial movement between the member 37 and the shaft 12. The element of the coupling which carries the inner drum 31 includes a cylindrical member 41 having a reduced end portion 42 receivable in the central opening of the inwardly directed flange 35 of the cooperating member of the coupling 15. The member 41 also includes an outwardly directed flange 43. The inner drum 31 and the flange portion 43 of the cylindrical member 41 are adapted to be secured to the flange of a member 44 by means of cap screws 45. The member 44 includes an axially disposed bore 46 adapted to receive the end of the power input shaft 12' disposed adjacent the end of the shaft 12 and arranged for fixed anchoring on the shaft 12' in any suitable manner, such as by the application of a plurality of pins 40 which serve to prevent relative rotation or axial movement between the member 44 and the shaft 12'. Suitable means in the form of a pair of thrust rings 47 and 48 are provided for insuring against relative axial movement between the adjacent ends of the shafts 12 and 12'. The thrust ring 47 is disposed to one side of the inwardly directed flange 35 of the member 34 and cooperates with the surface of the flange 35 and a shoulder 49 formed on the member 41. The other thrust ring 48 is disposed adjacent the opposite surface of the flange 35 and is retained in contact therewith by the application of a ring 50 which is retained in desired position of axial adjustment on the reduced end portion 42 of the cylindrical member 41 in any suitable manner, such as by the application of a set screw 51. It will be noted from the structure just described, that the cooperating elements of the coupling 15 are thus positively retained against relative axial movement even though the nature of the pneumatic cushion member 28 permits limited relative rotation between the elements of the coupling 15.

The provision of a coupling constructed in the manner just described for the adjacent ends of the respective power input shafts 12 and 12' of the speed reducers 13 and 13' affords a simple and effective means for insuring the proper distribution of load between the coupled speed reducers. Since the shafts 12 and 12' are constrained to unitary movement, any unbalance of load on either of the driving pinions 17 or 17' will result in the axial movement of both of the shafts 12 and 12', as a unit, for the purpose of equalizing the division of power diverted through each of the speed reducers 13 and 13'. By reason of the foregoing construction and arrangement of parts each of the speed reducers will, at all times, carry its allotted portion of the load in spite of the positive nature of the gear drive.

A brief description of the operation of the present power transmission will serve to emphasize its advantages in providing a simple and effective means in the form of a pair of parallelly arranged speed reducing units adapted to function in a manner in which a predetermined fractional part of the entire transmitted load is carried by each of the units. With the transmission set up in the manner previously described, the relatively high speed and low torque of the power output shaft 11 of the driving motor 10 is converted through the speed reducers 13 and 13' and the driving pinions 25 and 25' into a relatively low speed and high torque motion delivered to the driven gear 27 of the driven mechanism. If for any reason whatsoever one or the other branch of the power transmission should momentarily assume an excessive load the condition will be instantly transmitted to reacting means in the form of one or the other of the driving pinions 17 or 17' with the result that the coupled shafts 12 and 12' will move axially as a unit to reestablish the proper balanced condition in both branches of the power transmission.

Suitable alterations in the helical angles and size of teeth in the respective gear sets will serve to proportion the transmitted driving load in desired relationship between the respective power output shafts 19 and 19' of the respective speed reducing units 12 and 12'.

From the foregoing detailed description of an illustrative embodiment of the present invention, it will be noted that a simple and effective means has been provided in the form of a pair of parallelly arranged speed reducing units for proportioning and dividing the transmitted driving load between separate branches of the power transmission. It should also be noted that this novel arrangement of parts affords a simple and effective means for reducing the size, weight and cost of the component parts of the transmission with the result that this means of transmission may be expeditiously employed in many instances where previous forms of speed reducing units were either too cumbersome or expensive for serious consideration.

While the invention has been described in considerable detail in the foregoing specification, it is to be understood that various changes may be made in its embodiment without departing from or sacrificing any of the advantages hereinafter claimed.

I claim:

1. A power transmission for connecting driving and driven mechanisms, said power transmission comprising a plurality of gear sets each including a power input shaft and a power output shaft, connecting means for maintaining said power input shafts against relative axial movement, connecting means establishing driving relationship between said power input shafts and said driving mechanism, separate connecting means establishing driving relationship between said individual power output shafts and said driven mechanism, and reacting means on said power input shafts responsive to an excessive load on one portion of said transmission to effect a predetermined division of transmitted power between said gear sets by the unitary axial movement of said power input shafts and said reacting means.

2. A power transmission for connecting driving and driven mechanisms, said transmission comprising in part separate power transmitting branches each of which includes a gear set having a power input shaft and a power output shaft, connecting means for maintaining said power input shafts against relative axial movement, connecting means establishing driving relationship between said power input shafts and said driving mechanism, separate connecting means establishing driving relationship between said individual power output shafts and said driven mechanism, and reacting means on said power input shafts responsive to an excessive load in one branch of said transmission to effect a predetermined division of transmitted power through said separate power transmitting branches by the unitary axial movement of said power input shafts and said reaction means.

3. A power transmission for connecting driving and driven mechanisms, said power transmission comprising a plurality of gear sets each including a power input shaft and a power output shaft, said gear sets being arranged with said power input shafts in substantial axial alignment and said power output shafts in parallel spaced relationship, coupling means for maintaining said power input shafts against relative axial movement, connecting means establishing driving relationship between said power input shafts and said driving mechanism, separate connecting means establishing driving relationship between said individual power output shafts and said driven mechanism, and reacting means on said power input shafts responsive to an excessive load in one portion of said transmission to effect a predetermined division of transmitted power between said gear sets by the unitary axial movement of said power input shafts and said reacting means.

4. A power transmission for connecting driving and driven mechanisms, said transmission comprising in part separate power transmitting branches each of which includes a gear set having a power input shaft and a power output shaft, said gear sets being arranged with said power input shafts in substantial axial alignment and said power output shafts in parallel spaced relationship, coupling means for maintaining said power input shafts against relative axial movement, connecting means establishing driving relationship between said power input shafts and said driving mechanism, separate connecting means establishing driving relationship between said individual power output shafts and said driven mechanism, and reacting means on said power input shafts responsive to an excessive load in one branch of said transmission to effect a predetermined division of transmitted power through said separate power transmitting branches by the unitary axial movement of said power input shafts and said reacting means.

5. A power transmission for connecting driving and driven mechanisms, said power transmission comprising a plurality of gear sets each including power input and power output shafts, said gear sets being arranged with said power input shafts in substantial axial alignment and said power output shafts in parallel spaced relationship, a coupling between the adjacent ends of said power input shafts, said coupling precluding relative axial movement between said power input shafts, connecting means establishing driving relationship between said coupled power input shafts and said driving mechanism, separate connecting means establishing driving relationship between said individual power output shafts and said driven mechanism, and reacting means on said coupled power input shafts responsive to an excessive load in one portion of said transmission to effect a predetermined division of transmitted power between said gear sets by the unitary axial movement of said power input shafts and said reacting means.

6. A power transmission for connecting driving and driven mechanisms, said transmission comprising in part separate power transmitting branches each of which includes a gear set having a power input shaft and a power output shaft, said gear sets being arranged with said power input shafts in substantial axial alignment and said power output shafts in parallel spaced relationship, a coupling between the adjacent ends of said power input shafts, said coupling precluding relative axial movement between said power input shafts, connecting means establishing driving relationship between said coupled power input shafts and said driving mechanism, separate connecting means establishing driving relationship between said individual power output shafts and said driven mechanism, and reacting means on said coupled power input shafts responsive to an excessive load in one branch of said transmission to effect a predetermined division of transmitted power through said separate power transmitting branches by the unitary axial movement of said power input shafts and said reacting means.

7. A power transmission for connecting driving and driven mechanisms, said power transmission comprising a plurality of gear sets each including a power input shaft and a power output shaft, said gear sets being arranged with said power input shafts in substantial axial alignment and said power output shafts in parallel spaced relationship, bearing means for said power input shafts permitting axial movement thereof, a coupling between the adjacent ends of said power input shafts, said coupling precluding relative axial movement between said power input shafts, connecting means establishing driving relationship between said coupled power input shafts and said driving mechanism, separate connecting means establishing driving relationship between said individual power output shafts and said driven mechanism, and reacting means on said coupled power input shafts responsive to variations in the respective loads of said gear sets to effect the unitary axial movement of said power input shafts to reestablish the power division of transmitted load between said gear sets.

8. A power transmission for connecting driving and driven mechanisms, said power transmission comprising a plurality of gear sets each including a power input shaft and a power output shaft, each of the shafts of said separate gear sets carrying meshing helical gears, said gear sets being arranged with said power input shafts in substantial axial alignment, with their respective helical gears disposed in opposing relationship and said power output shafts in parallel spaced relationship, bearing means for said power input shafts permitting axial movement thereof, a coupling between the adjacent ends of said power input shafts, said coupling precluding relative axial movement between said power input shafts, connecting means establishing driving relationship between said coupled power input shafts and said driving mechanism, separate connecting means establishing driving relationship between said individual power output shafts and said driven mechanism, and reacting means on said coupled power input shafts in the form of said helical gears disposed in opposing relationship and responsive to variations in the respective loads of said gear sets to effect the unitary axial movement of said power input shafts to reestablish the proper division of transmitted load between said gear sets.

References Cited in the file of this patent

UNITED STATES PATENTS

| Number | Name | Date |
|---|---|---|
| 1,495,703 | MacFarland | May 27, 1924 |

FOREIGN PATENTS

| Number | Country | Date |
|---|---|---|
| 80,578 | Switzerland | Aug. 1, 1919 |